July 29, 1952   G. E. FOSTER   2,605,355
AUDIOMETER THRESHOLD SIGNAL ADJUSTING NETWORK
Filed March 17, 1950   2 SHEETS—SHEET 1
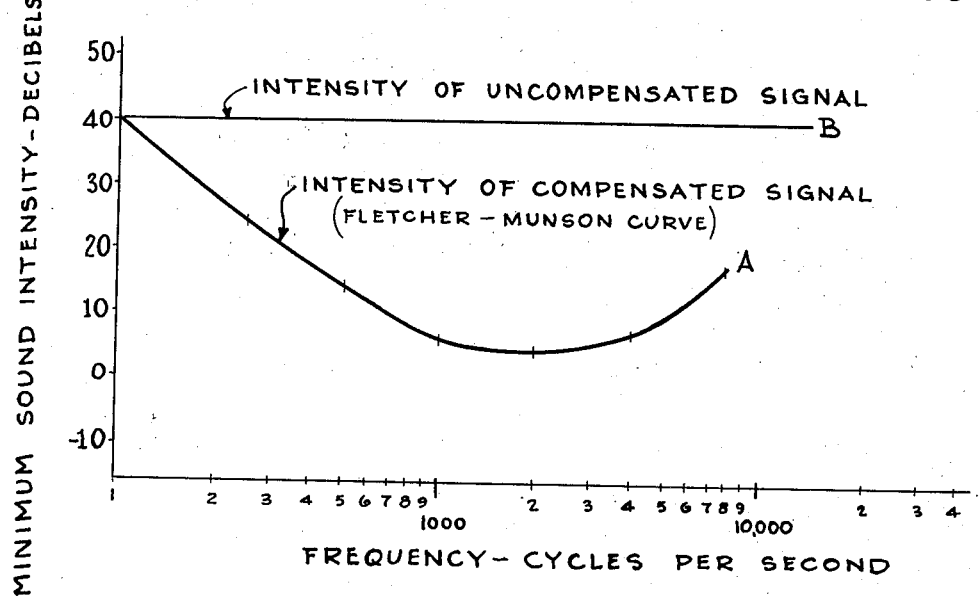
Fig. 1.
Fig. 2
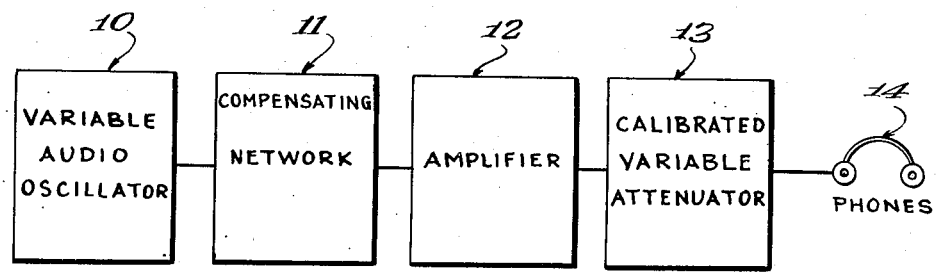
Inventor
George E. Foster
By I. Irving Silverman
Attorney July 29, 1952    G. E. FOSTER    2,605,355
AUDIOMETER THRESHOLD SIGNAL ADJUSTING NETWORK
Filed March 17, 1950    2 SHEETS—SHEET 2
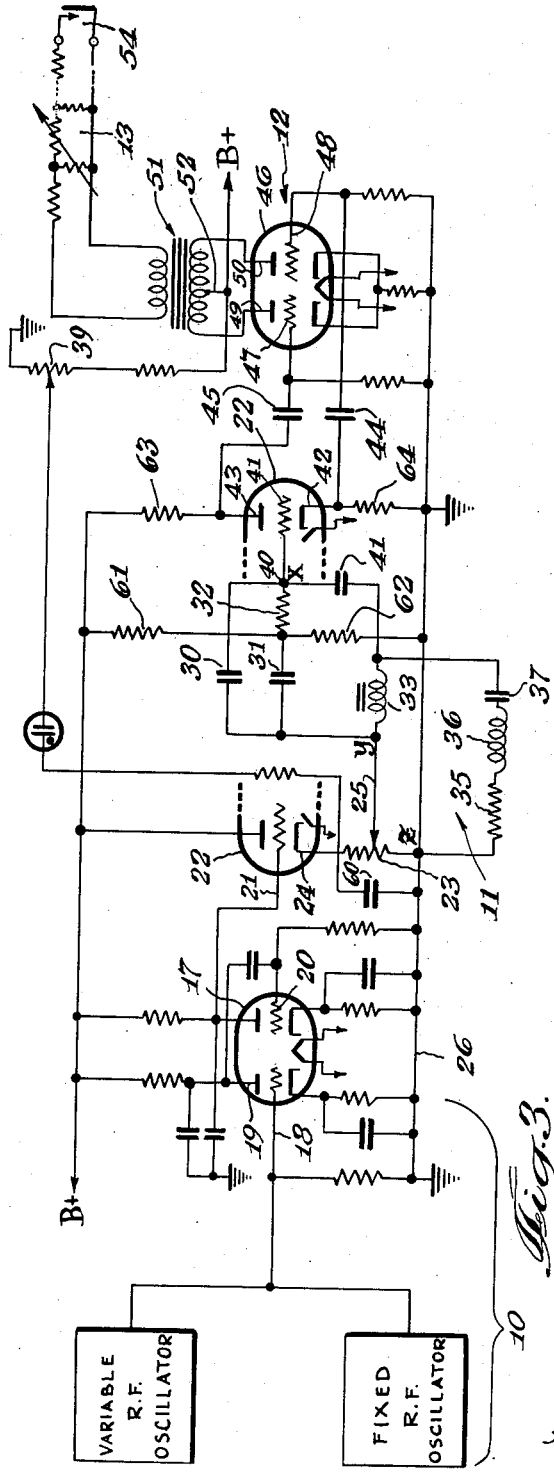
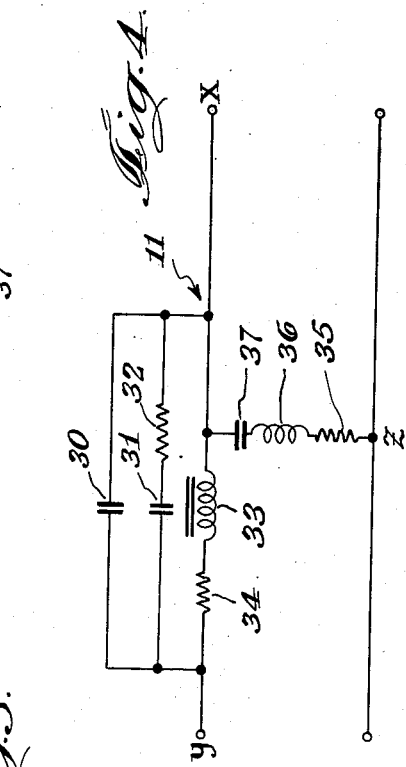
Inventor
George E. Foster
By
I. Irving Silverman
Attorney Patented July 29, 1952

2,605,355

UNITED STATES PATENT OFFICE 2,605,355

AUDIOMETER THRESHOLD SIGNAL ADJUSTING NETWORK

George E. Foster, Chicago, Ill.

Application March 17, 1950, Serial No. 150,187

6 Claims. (Cl. 178—44)

1

This invention relates to the construction of an audiometer, that is, a device for measuring the sensitivity of hearing of a person over the range of audio frequencies normally encountered. Specifically the invention relates to the provision of an audiometer which will enable measurements to be made at any desired frequency over the entire audio range and which has a novel and compensating network which automatically adjusts the output of the audiometer to the normal threshold of hearing over the entire range.

The threshold of audibility of sound for the human ear is variable over the range of frequencies normally encountered. This range of frequency is between 20 and 20,000 cycles. The threshold of audibility represents the minimum sound intensity usually measured in bars of pressure (dynes per square centimeter) audible to the normal ear. Research by Harvey Fletcher and others has resulted in the derivation of the well-known Fletcher-Munson curve shown in Fig. 1 which illustrates that the response of the human ear is variable. The Fletcher-Munson curve of Fig. 1 is drawn logarithmically with the horizontal ordinates representing decibels or relative amplitude and the vertical ordinates representing frequency of the signal. Obviously the sensitivity of the ear is maximum in the range 1000 to 3000 cycles, and is least at the upper and lower ends of the pertinent spectrum.

In determining whether the hearing of a person is normal, or in determining whether it departs from normal, it is required that a curve of the ear's response similar to the Fletcher-Munson curve be obtained, and a comparison be made between the two. To obtain the response curve, it is required to take measurements of the amplitude of signal which can just barely be heard over the entire range of frequencies and then to plot the curve. This procedure is not only tedious but requires relatively great skill. Audiometers have heretofore been constructed which provided for manual adjustments for the threshold, and in some instances have attempted to cause tracking of the level adjustment with the frequency adjustment so that the intensity would be changed. Again, such devices required a great many adjustments and measurements to be made and resulted in expensive and unwieldly equipment requiring skilled operators.

Other types of audiometers had multiple zero point attenuation in order to insert the proper loss at any given frequency. In such audiometers, continuously variable oscillators could be used, but the advantages of having an audio oscillator

2 whose frequency could be smoothly varied over the entire audio range are substantially reduced by reason of the fact that a zero adjustment is available only at certain predetermined points. Not only is this type of construction expensive to assemble and difficult to operate, but as well, a complete analysis of the patient's hearing can never be obtained. Instead only approximations can be obtained. The modern hearing aid equipment which is available at this time can be constructed to provide practically any desired amplified response, but unless an instrument is available which can be used to measure accurately the hearing deficiency of a patient, the increased quality of modern hearing aid equipment cannot fully be utilized. Such an instrument is contemplated by my invention, and is especially of great desirability because of its economy and consequent availability to practically any testing laboratory.

Important objects of my invention lie in overcoming the disadvantages of prior audiometers and in providing a simple, easily operated device which will measure the threshold of hearing of a given patient over the complete audio frequency.

A further object of the invention is to provide an audiometer in which there is produced a signal variable continuously and smoothly over the audio spectrum, and in which the output signal is attenuated automatically throughout the entire range so that the threshold sound level will be heard at an apparently constant intensity throughout said range by the normal ear.

Still a further object of the invention is to provide a device as described hereinabove in which there is a calibrated attenuator in the output of the said device whose setting will be constant throughout the entire audio frequency spectrum so long as the output signal from the device is being heard by a normal ear, but whose setting will quantitatively indicate the deviation of the patient's hearing from normal if the threshold need be adjusted as the signal is varied over the audio spectrum.

Another object of the invention is to provide an audiometer of the character described which has a loss-introducing network which causes the output signal of the audiometer to have the characteristics of the Fletcher-Munson curve of normal threshold response.

A further object of the invention lies in the provision of an electrical network whose response curve over the audio frequency spectrum corresponds to the characteristic of the normal threshold of the hearing.

Many other objects of the invention will become apparent as a description of my invention proceeds, but it is desired to point out that minor variations in the construction of my audiometer and the circuits thereof are capable of being made without departing from the spirit and scope of the invention. A preferred embodiment is illustrated in the accompanying drawings in which:

Fig. 1 is a diagram comprising the characteristics of threshold of hearing curve.

Fig. 2 is a simple block diagram of my audiometer showing the basic components thereof.

Fig. 3 is a schematic electrical diagram of the circuit of the principal components of my audiometer.

Fig. 4 is a simplified electrical diagram of the loss introducing network portion of the audiometer, showing the same between points designated X, Y, and Z in the circuit.

Referring generally to the component parts of an audiometer constructed in accordance with my invention, same are illustrated in block form in Fig. 2, and comprise generally a variable audio oscillator 10 capable of providing a signal variable over the audio frequency range. The signal from the oscillator 10 is fed through a compensating network 11 whose purpose is to attentuate the signal in a predetermined manner so that the resulting signal varies generally as the curve A of Fig. 1. The said network 11 is the heart of my invention, and in addition to comprising the principal novel features thereof, is that part of the audiometer which enables other advantageous constructional features to be incorporated therein.

The signal from the compensating network is amplified by suitable means 12 and attenuated by a calibrated attenuator 13 in order to measure the variance from normal hearing. Thence the signal is fed into an output device such as for example earphones 14 worn by the patient.

Any suitable source of D. C. power may be utilized to supply the tube biases of my device, such as for example, batteries or rectified A. C. or the like. No source of such power is shown since the manner of constructing the same is well-known and capable of great variation. It should be pointed out, however, that in the event a power supply derived from an A. C. source is utilized, precautions should be taken to filter out the line frequency to eliminate as much as possible any likelihood of hum in the output signal.

Referring now to Fig. 3, it will be noted that the audio oscillator 10 consists of a pair of radio frequency oscillators 15 and 16 which can be constructed cheaply and with more stable and uniform characteristics over the required range, than an audio oscillator and which can readily be beaten together to provide the necessary audio signal. For this purpose the oscillator 15 is variable over a suitable range. Since the design of this type of oscillator is conventional both oscillators 15 and 16 are shown as block diagrams feeding a signal into the tube 17, which is a twin triode. The first section of the tube 17 comprises a mixer and both signals from the respective oscillators 15 and 16 are impressed on the grid 18 and the output from said first section is amplified in the second section. Thus, the plate 19 is coupled to the grid 20 of the second section of tube 17, whose output in turn is impressed upon the grid 21 of the first section of another twin triode 22.

Said first section of tube 22 comprises a cathode follower whose purpose is to drive the signal through the network 11. The output is taken off the resistor 23 of the cathode 24 in order to provide a low impedance input to the compensating network 11 which follows. The signal enters the network between the lead 25 and the ground 26, and it will be noted that the amplitude of the signal may be adjusted by reason of the fact that resistor 23 is a potentiometer. This is a factory adjustment whose purpose is to calibrate the output signal at the earphones for proper intensity at zero setting of the calibrated attenuator 13. The neon tube 27, biased from resistor 39 enables the oscillator zero to be adjusted visually.

The compensating network consists of the following elements: A capacitor 30, series connected in lead 25; a capacitor 31 and resistor 32 in series therewith, both being connected in parallel with capacitor 30; a relatively high inductance 33 having an internal resistance 34 also in parallel with capacitor 30; and a resistor 35, inductance 36, capacitor 37 series combination connected in shunt from ground 26 to the output side of the network at point 40 through a large coupling condenser 41'. This condenser 41' blocks the D. C. from grid 41 and passes low audio frequencies, but has no effect upon the network proper. The network is designed to insert the required loss over the range of frequencies used and is best seen in Fig. 4 without the other parts of the audiometer circuit.

The signal now appears between point 40 and ground 26 and is impressed on the grid 41 of the second section of the tube 22 which is a phase splitting device. The signal is thus converted into two identical signals 180° out of phase at the cathode 42 and plate 43, and the respective mirror signals are fed through coupling condensers 44 and 45 respectively into the push-pull amplifier 12. The amplifier 12 is formed by the two sections of a third twin triode 46 upon whose grids 47 and 48 the said mirror signals are impressed. The output is obtained from the plates 49 and 50 and these are connected to the opposite ends of the primary of the output transformer 51. The plate power is supplied to the center tap 52. The secondary of the transformer 51 feeds the resulting signal into a suitable calibrated attenuator 13 and thence into a phone jack 54.

In operation, if a threshold signal, i. e., of an intensity which can just barely be heard, is impressed upon earphones worn by a patient with normal hearing, for a given minimum setting of the attenuator 13, as the frequency is varied throughout the entire audio range, the intensity will apparently seem to be the same. In other words, say that the frequency of the signal is 2000 cycles, and that the level of the intensity of the uncompensated signal is measured at B in Fig. 1 as 40 decibels. At this point the human ear is most sensitive, and considering the Fletcher-Munson characteristic, the intensity for threshold need only be at 5 decibels, the uncompensated signal is 35 decibels too high. At this frequency, therefore, the network 11 will insert a loss of 35 decibels so that the signal intensity at 2000 cycles will be 5 decibels. This inserted loss varies smoothly along the audio spectrum without any adjustments being required so that the level follows substantially the curve A of Fig. 1. For the patient with normal hearing, the setting of the attenuator 13 is not changed, after proper adjustment of the potentiometer 23. The attenuator 13 is of any suitable design and may be for example, a multiple section ladder-type pad.

Presuming now that a patient having subnormal hearing is wearing the earphones, as the frequency of the signal is varied, there will be places where the attentuator 13 will require adjustment in order to bring the signal up to the threshold of the patient's hearing. The values read upon the attentuator will correspond to the decreased impedance which was necessary to bring the signal up to normal threshold intensity and therefore are a direct measure of the deficiency of the patient's hearing at the frequencies measured.

With the information gained as to the quality of the patient's hearing over the spectrum it is possible to provide the proper hearing aid for the patient which will give the necessary signal boost at the precise points needed. In addition, after the hearing aid has been provided it is possible to carefully and accurately check the value thereof to the patient's hearing quickly and in very little time.

Considering now the loss-introducing network 11 shown in Fig. 4, same is designed, as stated above, to introduce the loss which will cause the characteristic of the output to approximate the Fletcher-Munson curve A. The loss is represented in Fig. 1 as the distance between the curves A and B at any given frequency.

The condenser 37 and choke 33 are chosen to resonate at 100 cycles per second. Resistors 34 and 35 are chosen such that at 2000 cycles per second, i. e., the point of maximum sensitivity of the ear, the level will have fallen 35 db below the level at 100 cycles per second. Resistor 35 is thus a shunt loading resistor. Resistor 34 is the internal D. C. resistance of the choke 33 (shown only in Fig. 4) and the proper choice of this value will enable the curve A between 100 and 1000 cycles to follow the Fletcher-Munson characteristic. Condensers 30 and 31 and resistor 32 are chosen to provide a proper low impedance path for the signal at the higher frequencies from 2000 cycles upward. The inductance 36 increases the shunt impedance to give additional high end boost.

The network described will give the desired results when operated from a source of approximately 1000 ohms into a load of approximately 10,000 ohms, making it convenient to follow same with a vacuum tube.

In a practical example of my audiometer, the following values were used for the elements of the network 11:

Resistor 35 _____ 2700 ohms
Resistor 32 _____ 15,000 ohms
(Resistance) 34 _____ 400 ohms
Capacitor 30 _____ 500 micro-micro farads
Capacitor 31 _____ 500 micro-micro farads
Capacitor 37 _____ 0.1 micro-farad
Choke 33 _____ 40 henries (iron core)
Choke 36 _____ 150 millehenries The coupling capacitor 41 had a capacity of 0.05 microfarads.

In the said example all tubes used were 12 AU 7's, including those in the radio frequency oscillators. The oscillator 15 was tunable from 242 to 255 kilocycles per second, while the oscillator 16 was fixed at 255 kilocycles. The power was provided by a well-filtered power pack, using a 6 x 4 connected as a full wave rectifier.

Any suitable circuit constants can be utilized in connection with the mixer and amplifier sections of tube 17 and hence it is not deemed necessary to refer to same. As for the driver section of tube 22, the cathode resistor 23 is a 25,000 ohm potentiometer and the by-pass condenser 60 is .001 microfarad. The voltage dividing resistors 61 and 62 are 560,000 ohms and 330,000 ohms respectively. Grid and plate resistors 63 and 64 of the phase splitting section are both 47,000 ohms. All other circuit constants are readily determined in any conventional manner from tube characteristics, engineering data, etc.

It is believed that this invention, its mode of construction and assembly, and many of its advantages should be readily understood from the foregoing without further description, and it should also be manifest that while a preferred embodiment of the invention has been shown and described for illustrative purposes, the specific details are nevertheless capable of wide variation within the purview of this invention as defined in the appended claims.

What is claimed and desired to be secured by Letters Patent of the United States is:

1. In an audiometer circuit, a loss-introducing network having a voltage-frequency characteristic substantially the same as the Fletcher-Munson curve of normal threshold response, said network having one shunt branch and a plurality of parallel connected series impedance branches, the shunt branch and one series branch having respectively a capacitive and an inductive reactor therein which together are resonant at approximately 100 cycles per second and presenting increased impedance to the flow of current at frequencies higher than 100 cycles, and the said one series branch having a low resistance therein, and the shunt branch having a loading resistor series-connected therein of value relative to said resistance and said reactors to cause the output voltage to drop approximately 35 decibels at a frequency of 2000 cycles per second, but following substantially the Fletcher-Munson characteristic as the frequency varies from 100 to 2000 cycles per second, the additional series branches serving as paths of increased current at frequencies higher than 2000 cycles per second.

2. In an audiometer circuit, a loss-introducing network having a voltage-frequency characteristic substantially the same as the Fletcher-Munson curve of normal threshold response, said network having one shunt branch and a plurality of parallel connected series impedance branches, the shunt branch and one series branch having respectively a capacitive and an inductive reactor therein which together are resonant at approximately 100 cycles per second, and presenting increased impedance to the flow of current at frequencies higher than 100 cycles, and the said one series branch having a low resistance therein, and the shunt branch having a loading resistor of value relative to said resistance and said reactors to cause the output voltage to drop approximately 35 decibels at a frequency of 2000 cycles per second but following substantially the Fletcher-Munson characteristic as the frequency varies from 100 to 2000 cycles per second, and other series branches having reactors, the impedances of which decrease with increase in frequency from 2000 cycles per second upward whereby to increase the output signal in accordance with the Fletcher-Munson characteristic.

3. In an audiometer, a loss-introducing network comprising a shunt branch and a series arm, said series arm comprising three series branches all connected in parallel, one series branch being inductive and the shunt branch being primarily capacitive, the other series branches being capacitive, the inductive series branch and shunt branch being resonant at the low end of the audio spectrum and having resistance for varying the loss with frequency up to 2000 cycles per second in accordance with the Fletcher-Munson characteristic, and the other branches decreasing in impedance from 2000 cycles per second upward whereby to decrease the introduced loss, and having resistance therein causing the loss to vary with frequency with the Fletcher-Munson characteristic.

4. In an audiometer a loss-introducing network comprising a shunt branch and a series arm, said series arm comprising three series branches all connected in parallel, one series branch being inductive and the shunt branch being primarily capacitive, the other series branches being capacitive, the inductive series branch and shunt branch being resonant at the low end of the audio spectrum and having resistance for varying the loss with frequency up to 2000 cycles per second in accordance with the Fletcher-Munson characteristic, and the other branches decreasing in impedance from 2000 cycles per second upward whereby to decrease the introduced loss and having resistance therein causing the loss to vary with frequency with the Fletcher-Munson characteristic, and means for coupling the output of the network to a high impedance input comprising a D. C. blocking device capable of passing very low frequencies.

5. A loss introducing network as defined in claim 3 in which the branches are comprised as follows: the shunt branch having a resistance of approximately 2700 ohms, an inductance of approximately 150 millehenries, and a capacitance of approximately .1 microfarad; the first series branch having a capacitance of approximately 500 micro-microfarads; the second series branch having a capacitance of approximately 500 micro-microfarads and a resistance of approximately 15,000 ohms; and the third series branch having an inductance of approximately 40 henries and a resistance of approximately 400 ohms.

6. In an audiometer circuit, a loss-introducing network having a voltage-frequency characteristic substantially the same as the Fletcher-Munson curve of normal threshold response, said network having one shunt branch and a plurality of parallel connected series impedance branches, the shunt branch and one series branch having respectively a capacitive and an inductive reactor therein which together are resonant at approximately 100 cycles per second and which present increased impedance to flow of current at frequencies higher than 100 cycles, and the said one series branch having a low resistance therein comprising the internal resistance of said inductive reactor, the shunt branch having a loading resistor of a value substantially greater than the said resistance and related thereto and to the reactors to cause the output voltage of the network to drop approximately 35 decibels at a frequency of approximately 2000 cycles per second, but following substantially the Fletcher-Munson characteristic as the frequency varies from 100 to 2000 cycles per second, the other series branches having capacitive reactors therein the reactances of which decrease with increase frequency from 2000 cycles per second upward whereby to increase the output signal in accordance with the said Fletcher-Munson characteristic.

GEORGE E. FOSTER.

REFERENCES CITED

The following references are of record in the file of this patent:

UNITED STATES PATENTS

| Number | Name | Date |
| --- | --- | --- |
| 1,788,035 | Stevenson | Jan. 6, 1931 |
| 1,862,458 | Barstow | June 7, 1932 |
| 1,938,256 | Jacobs | Dec. 5, 1933 |
| 2,113,003 | Van Slooten | Apr. 5, 1938 |
| 2,121,150 | Jarvis | June 21, 1938 |
| 2,257,263 | Koren | Sept. 30, 1941 |